United States Patent [19]
Lin

[11] Patent Number: 5,862,036
[45] Date of Patent: Jan. 19, 1999

[54] DOCK FOR CONNECTING A NOTEBOOK COMPUTER TO A PC

[75] Inventor: Jin-Jen Lin, Taipei, Taiwan

[73] Assignee: Inventec Corporation, Taipei, Taiwan

[21] Appl. No.: 883,855

[22] Filed: Jun. 27, 1997

[30] Foreign Application Priority Data

Apr. 8, 1997 [TW] Taiwan ................................ 86205401

[51] Int. Cl.⁶ ................................ G06F 1/16; A05K 7/10
[52] U.S. Cl. ............................................................. 361/686
[58] Field of Search ................................... 361/686, 683; 364/708.1; 108/108; 312/223.2; G06F 1/20

[56] References Cited

U.S. PATENT DOCUMENTS

| | | | |
|---|---|---|---|
| 4,659,159 | 4/1987 | Takahashi | 361/686 |
| 5,684,673 | 11/1997 | Shibasaki et al. | 361/686 |
| 5,694,292 | 12/1997 | Paulsel et al. | 361/686 |
| 5,784,253 | 7/1998 | Ooka et al. | 361/686 |
| 5,790,375 | 8/1998 | Lee | 361/686 |

*Primary Examiner*—Lynn D. Feild
*Attorney, Agent, or Firm*—Bacon & Thomas, PLLC

[57] ABSTRACT

A dock for connecting a notebook computer to a personal computer, having a casing having a top notebook computer bearing wall, a sliding block longitudinally moved in the casing, an actuating arm transversely fastened to the sliding block, and two guide mechanisms bilaterally disposed inside the casing and partially projecting out of the top notebook computer bearing wall of the casing for guiding the notebook computer into position, each guide mechanism including a guide block, a spring imparting a downward pulling force to the guide block and a pivoted push rod forced by the actuating arm to push the guide block out of the top notebook bearing wall for guiding the notebook computer into position, wherein when the notebook computer is loaded and moved into position, the sliding block is pushed forwards to move the actuating arm away from the pivoted push rods of the guide mechanisms, causing the guide blocks of the guide mechanisms to be pulled downwards from the top notebook bearing wall and received inside the casing.

5 Claims, 5 Drawing Sheets

5,862,036

DOCK FOR CONNECTING A NOTEBOOK COMPUTER TO A PC

BACKGROUND OF THE INVENTION

The present invention relates to a dock for connecting a notebook computer to a personal computer, which has two vertically movably guide blocks for guiding the notebook computer into position that are pulled downwards and received inside the dock after the installation of the notebook computer.

When to connect a notebook computer to a personal computer, a dock shall be used. A dock for this purpose has a cable for connection to the personal computer, a top bearing wall for receiving the notebook computer, an electrical connector at the front side of the top bearing wall for the connection of the corresponding electrical connector of the notebook computer, and two guide rails bilaterally raised from the top bearing wall for guiding the notebook computer into position. When the notebook computer is loaded, its side expansion slot for peripheral apparatus is blocked by one guide rail, therefore a computer peripheral apparatus cannot be connected to the notebook computer when the notebook computer is installed in the dock.

SUMMARY OF THE INVENTION

The present invention has been accomplished to provide a dock for connecting a notebook computer to a personal computer which eliminates the aforesaid problem. According to the present invention, the dock comprises a casing having a top notebook computer bearing wall, a sliding block longitudinally moved in the casing and having for example two upright rods extending out of a sliding hole in front of the top notebook computer bearing wall, an actuating arm transversely fastened to the sliding block, and two guide mechanisms bilaterally disposed inside the casing and partially projecting out of the top notebook computer bearing wall of the casing for guiding the notebook computer into position, each guide mechanism including a guide block, a spring imparting a downward pulling force to the guide block and a pivoted push rod forced by the actuating arm to push the guide block out of the top notebook bearing wall for guiding the notebook computer into position, wherein when the notebook computer is loaded on the top notebook computer bearing wall and moved forwards into position, the sliding block is pushed forwards to move the actuating arm away from the pivoted push rods of the guide mechanisms, causing the guide blocks of the guide mechanisms to be pulled downwards from the top notebook bearing wall and received inside the casing. Therefore, the guide blocks of the guide mechanisms are automatically received inside the casing of the dock, when the notebook computer is installed, without obstructing the connection of a cable of a peripheral apparatus to one side expansion slot of the notebook computer.

DETAILED DESCRIPTION OF THE PREFERRED EMBODIMENT

Figure 1:
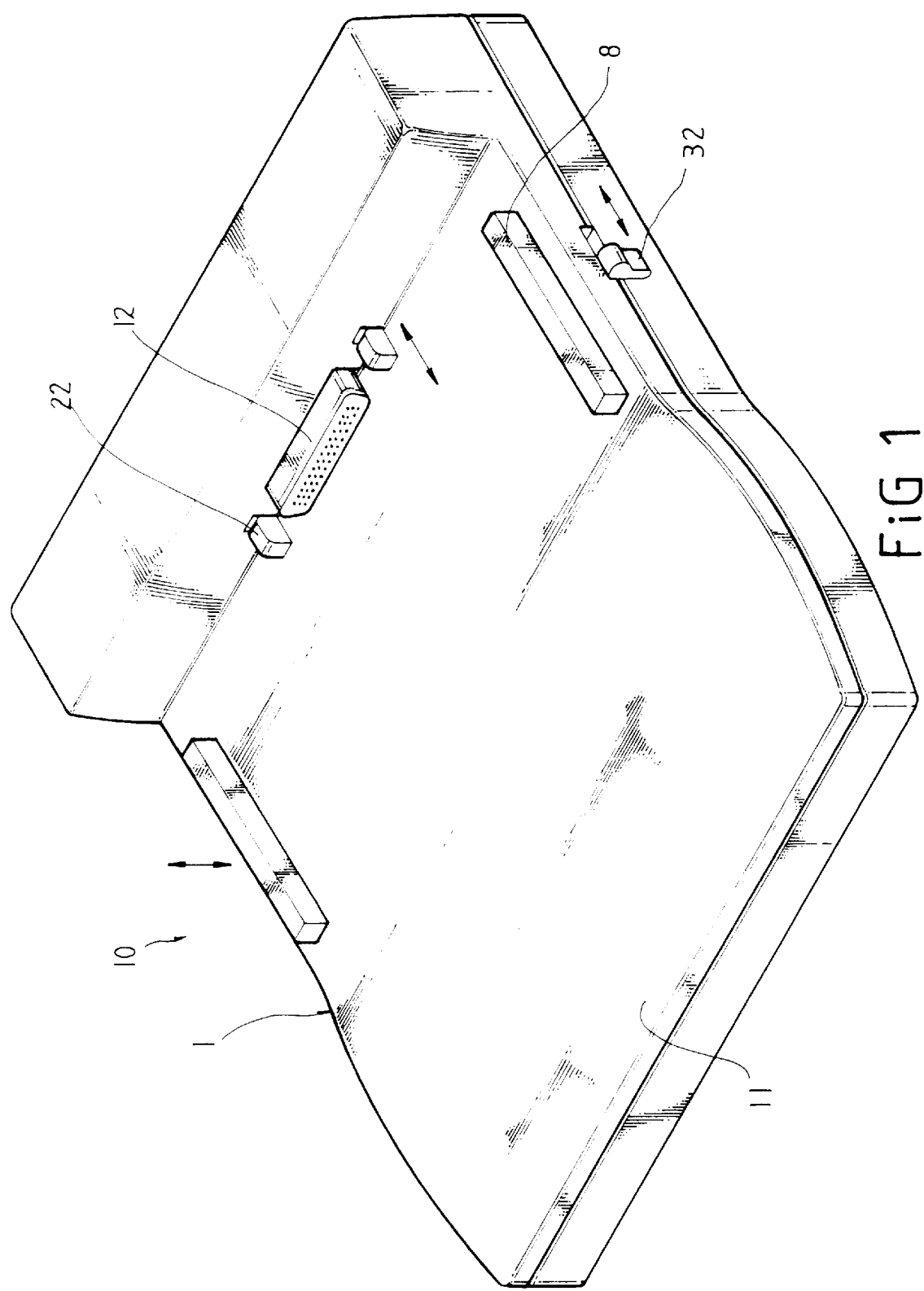
FIG. 1 is an elevational view of a dock according to the present invention.
Figure 2:
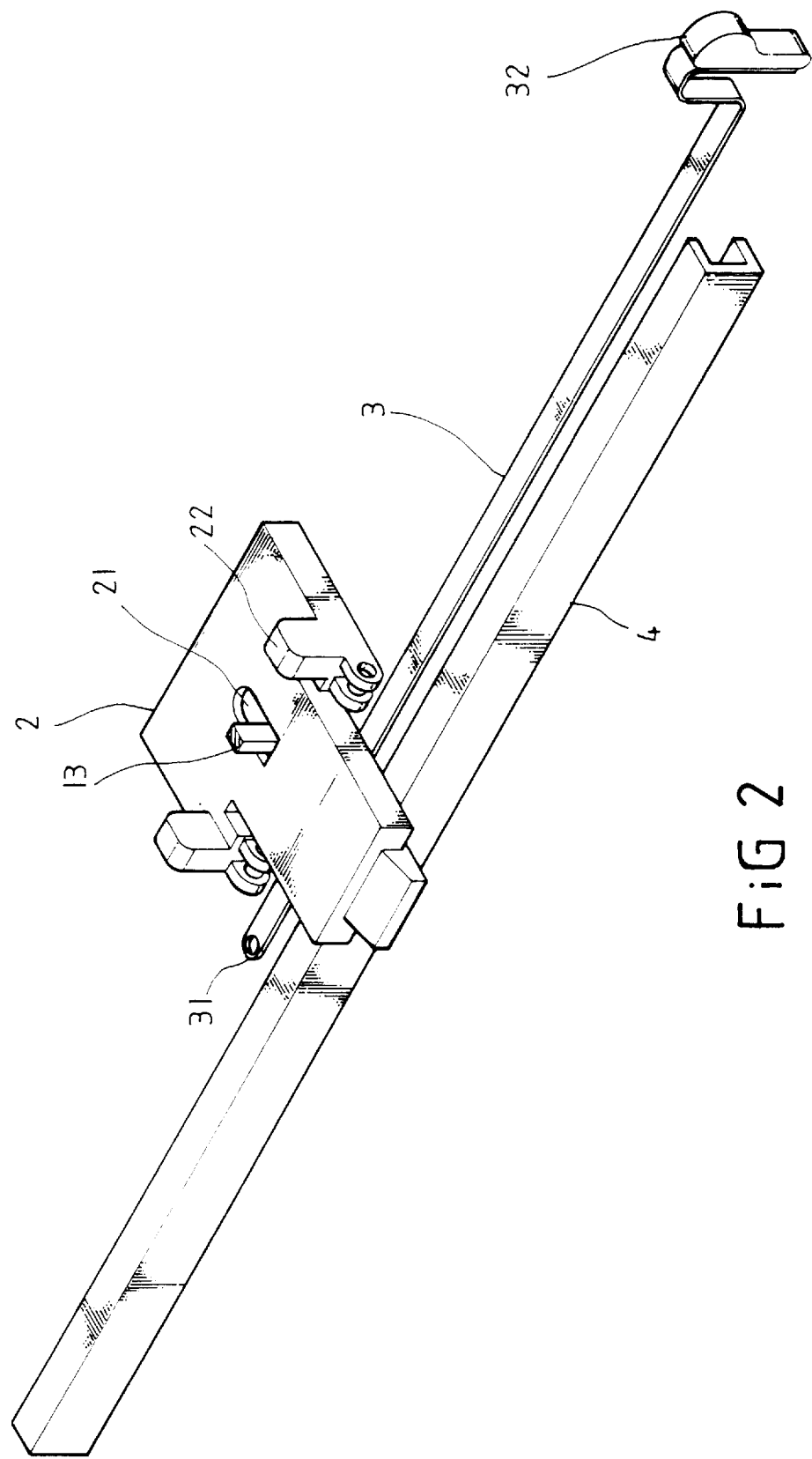
FIG. 2 is an elevational view in an enlarged scale of a part of the present invention, showing the actuating arm and the release bar connected to the sliding block.

Referring to FIGS. 1 and 2, a dock 10 is adapted to serve as an interface between a notebook computer 20 (see FIG. 6) and a personal computer (not shown).

The dock 10 comprises a casing 1 having a top bearing wall 11 adapted for receiving the notebook computer 20 (see FIG. 6), a connector 12 mounted on the top bearing wall 11 at its front side to which a notebook computer connector is connected, a stop rod 13 vertically disposed inside the casing 1, a longitudinal sliding block 2 longitudinally moved inside the casing 1 and having a longitudinal sliding slot 21 coupled to the upright stop rod 13 to limit the sliding distance of the upright stop rod 13 and at least one for example two upright rods 22 projecting out of the top bearing wall 11 through a respective sliding hole at two opposite sides of the connector 12, a release bar 3 is coupled to the sliding block 2 and having a end 31 to be pivoted to the casing 1 and the other end terminating in a handle 32 extending out of one lateral side of the casing 1 through a hole thereof.

Figure 3:
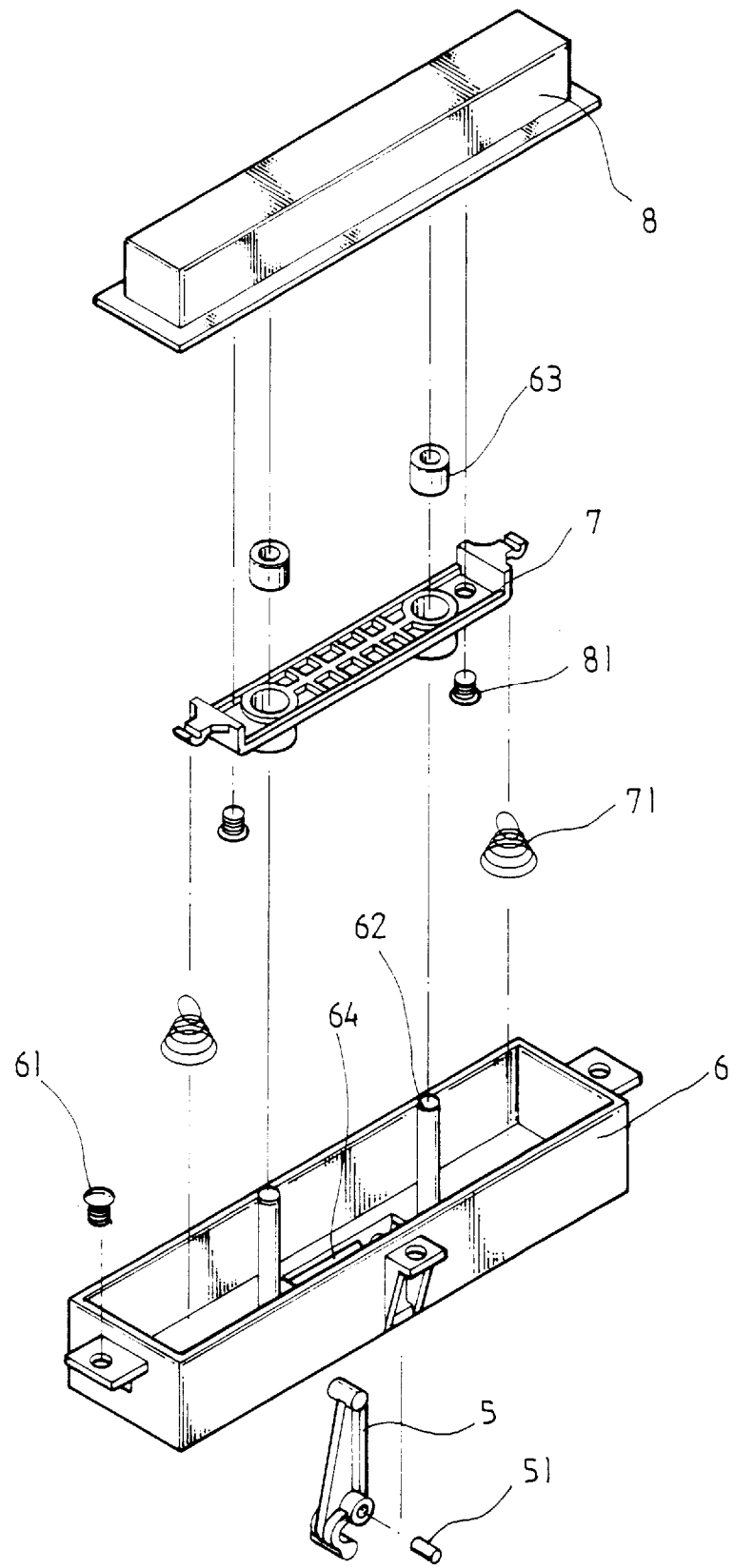
FIG. 3 is an exploded view of a guide mechanism according to the present invention.

Referring to FIG. 3 and FIGS. 1 and 2 again, an actuating arm 4 which is made from a channel bar is fixedly fastened to the sliding block 2 inside the casing 1, having two opposite ends respectively stopped at a respective push rod 5 of a guide mechanism. The push rod 5 is turned about a pivot 51, having one end stopped at one end of the actuating arm 4 and an opposite end inserted through a respective hollow locating block 6 of U-shaped cross section. The locating block 6 is fixedly fastened to a bottom wall of the casing 1 by screws 61, having a through hole 64 in the middle through which the respective push rod 5 passes, and at least one for example two upright guide rods 62 at two opposite sides of the through hole 64. A support plate 7 is moved along the upright guide rods 62 of the locating block 6 and supported on spring elements 71 inside the locating block 6. The spring elements 71 impart a downward pulling force to the support plate 7. Bushings 63 are respectively mounted in (a respective hole of) the support plate 7 and sleeved onto the upright guide rods 62 to smoothen the movement of the support plate 7 relative to the upright guide rods 62. A guide block 8 is fixedly fastened to the support plate 7 at the top by screws 81. When installed, the guide block 8 projects out of the top bearing wall 11 of the casing 1 through a hole thereof.

Figure 4:
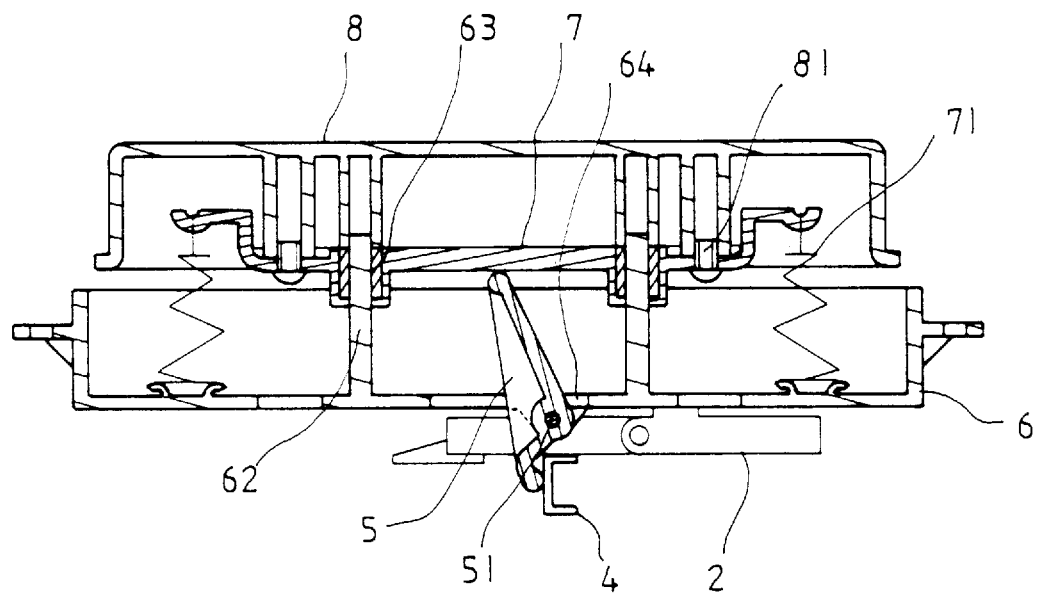
FIG. 4 is a sectional assembly view of the guide mechanism shown in FIG. 3.

Referring to FIG. 4, before the loading of the notebook computer 20 on the dock 10, the push rod 5 is forced by the actuating arm 4 to push the respective support plate 7 upwards, thereby causing the respective guide block 8 to project out of the top bearing wall 11 of the casing 1.

Figure 5:
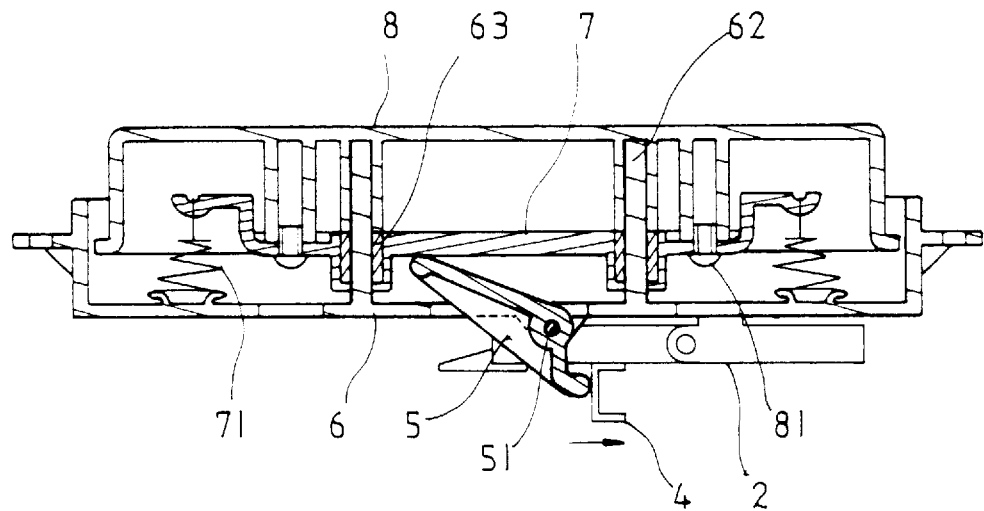
FIG. 5 is similar to FIG. 4, but showing the support plate pulled down.
Figure 6:
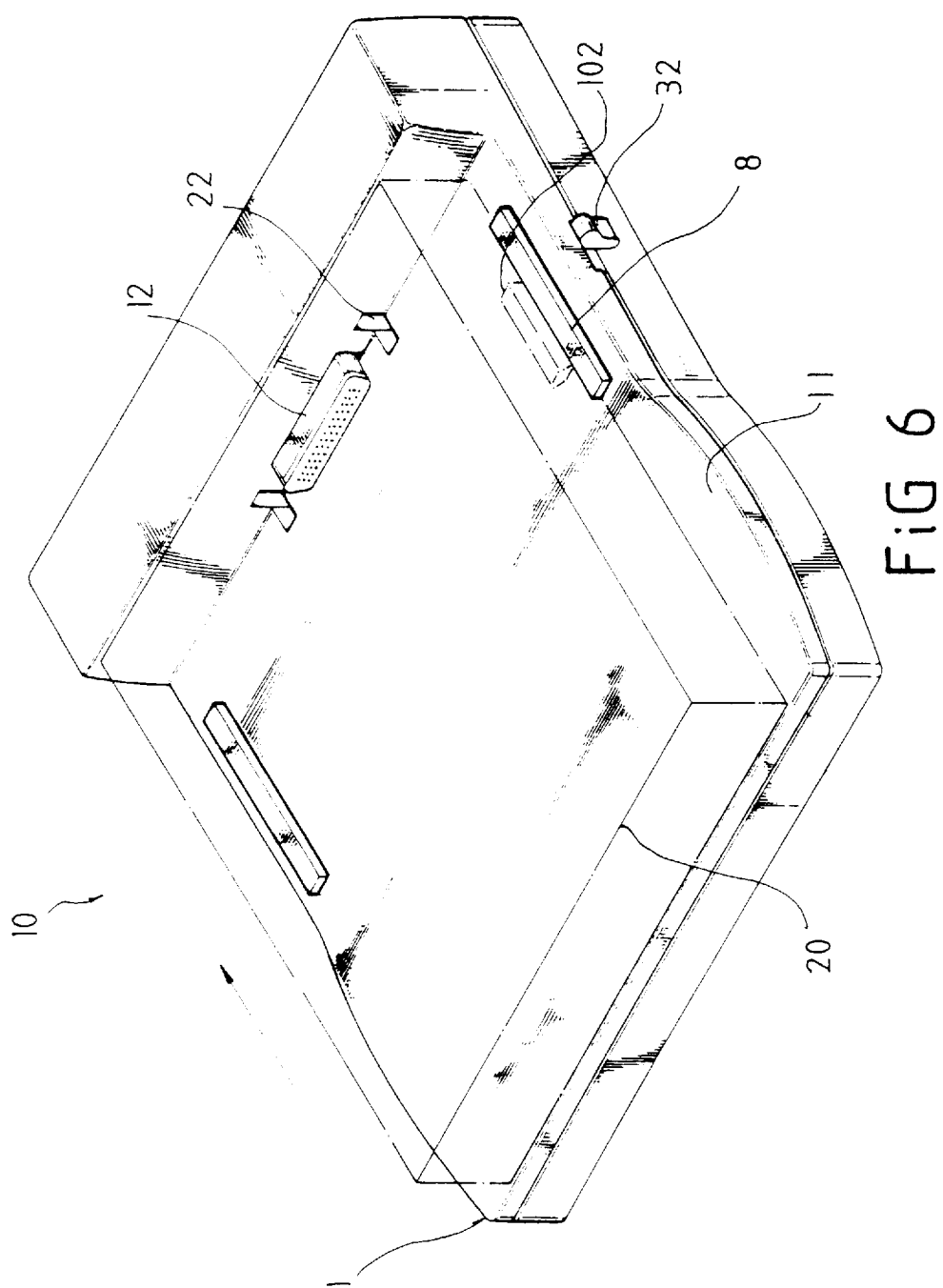
FIG. 6 is an applied view of the present invention, showing the notebook computer loaded.

Referring to FIGS. 5 and 6, when the notebook computer 20 is loaded on the top bearing wall 11 of the casing 1, it is moved forwards between the guide blocks 8 to force its connector into connection with the connector 12. When the notebook computer 20 is electrically connected to the connector 12, upright rods 22 of the sliding block 2 are pushed forwards, causing the sliding block 2 to carry the actuating arm 4 forwardly away from the two push rods 5. When the actuating arm 4 is released from the push rods 5, the springy elements for example metal springs 71 immediately pull the respective support plates 7 downwards, and therefore the guide blocks 8 are received inside the casing 1 without obstructing the connection of a peripheral cable to one side connector 102 of the notebook computer 10. When the notebook computer 20 is removed from the dock 10, the release bar 3 is turned to move the sliding block 2 backwards, causing the actuating arm 4 to turn the push rods 5 to their former positions, and therefore the support plates 7 are respectively forced by the push rods 5 to lift the respective guide blocks 8 out of the top bearing wall 11 of the casing 1.

While only one embodiment of the present invention has been shown and described, it will be understood that various modifications and changes could be made thereunto without departing from the spirit and scope of the invention disclosed.

What the invention claimed is:

1. A dock for use as an interface between a notebook computer and a personal computer, comprising:

a casing having a top bearing wall adapted for receiving the notebook computer and an electrical connector adapted for connecting to an electrical connector of the notebook computer;

a sliding block moved inside said casing, having at least one upright rod disposed in a respective sliding hole at one side of the electrical connector of said casing and an actuating arm transversely disposed at a rear side thereof; and two guide mechanisms bilaterally disposed in said casing, each of said guide mechanisms comprising a locating block fixedly mounted inside said casing and having a through hole, a support plate, spring elements fixedly fastened to said locating block and imparting a downward pulling force to said support plate, a guide block fixedly fastened to said support plate and moved with said support plate in and out of a respective hole in said top bearing wall of said casing, and a push rod turned about a pivot inside said casing and having a bottom end stopped at one end of said actuating arm and a top end inserted into the through hole of said locating block to push said guide block out of said top bearing wall of said casing for guiding the notebook computer into position;

wherein when the notebook computer is loaded on said top bearing wall of said casing and pushed forward into connection with the electrical connector of said casing, the at least one upright rod of said sliding block is pushed forwards, causing said actuating arm to be moved with said sliding block forwardly from the push rods of said guide mechanisms, and therefore the support plates of said guide mechanisms are released from the respective push rods and pulled downwards by said spring elements to lower said guide blocks from the respective holes in the top bearing wall of said casing.

2. The dock of claim 1, wherein said sliding block has a longitudinal sliding slot coupled to a fixed stop rod inside said casing to limit its sliding distance.

3. The dock of claim 1 further comprising a release bar controlled to return said sliding block to its former position, said release bar having a fixed end pivoted to a pivot inside said casing, a middle part connected to said sliding block, and a free end terminating in a handle extending out of a lateral side hole of said casing.

4. The dock of claim 1, wherein said spring elements are metal springs.

5. The dock of claim 1, wherein the locating block of each of said guide mechanisms comprises at least one upright guide rod mounted with a respective bushing and adapted for guiding the movement of the respective support plate.

* * * * *